United States Patent [19]
Boudreau

[11] 4,033,622
[45] July 5, 1977

[54] INFANT'S CAR SEAT
[75] Inventor: Robert J. Boudreau, Bedford, Pa.
[73] Assignee: Hedstrom Co., Bedford, Pa.
[22] Filed: June 29, 1976
[21] Appl. No.: 700,913
[52] U.S. Cl. .............................. 297/250; 297/384; 297/389; 297/310
[51] Int. Cl.² .......................................... A47D 1/10
[58] Field of Search .......... 297/250, 253, 254, 216, 297/310

[56] References Cited
UNITED STATES PATENTS

| | | | |
|---|---|---|---|
| 1,375,337 | 4/1921 | Wagner | 297/310 |
| 2,971,566 | 2/1961 | Negroni | 297/216 |
| 3,220,769 | 11/1965 | Regan | 297/216 X |
| 3,861,742 | 1/1975 | Leonard et al. | 297/253 |
| 3,910,634 | 10/1975 | Morris | 297/250 X |
| 3,922,035 | 11/1975 | Wener | 297/250 |
| 3,948,556 | 4/1976 | Hyde et al. | 297/250 |

Primary Examiner—Francis K. Zugel
Attorney, Agent, or Firm—Cesari and McKenna

[57] ABSTRACT

A seat for restraining an infant in a car has a steel truss frame to which is secured a molded plastic shell in which the child sits or reclines. The frame is secured to the front or back seat of the automobile by the customary lap belt and the infant is held in the car seat by an adjustable safety harness anchored to the frame and which is arranged to distribute reaction forces over broad areas of the child's body. The shell of the car seat includes wing portions terminating in energy absorbing foam padding which extend out from the back of the shell on each side of the child's head so as to protect the child's head in the event of side impacts.

8 Claims, 5 Drawing Figures

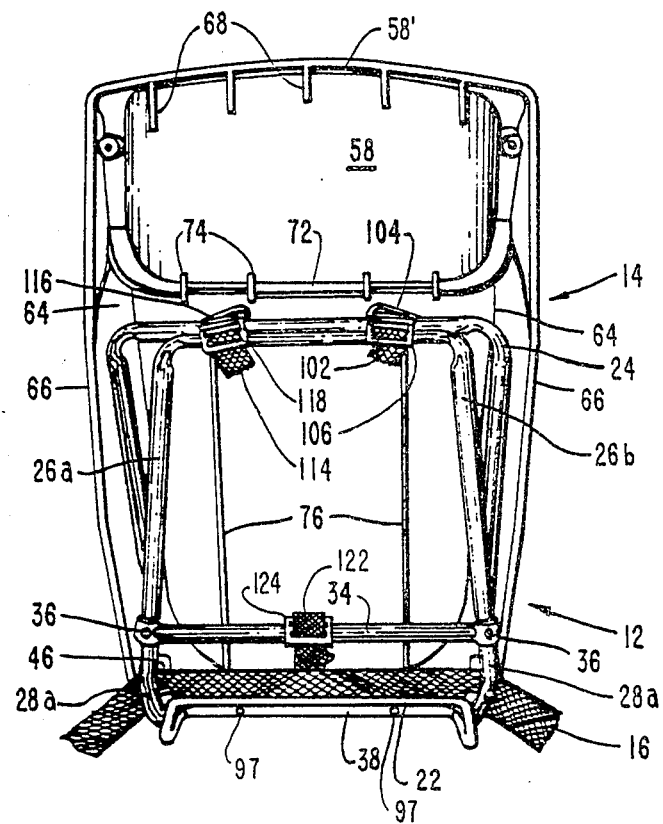
FIG. 3
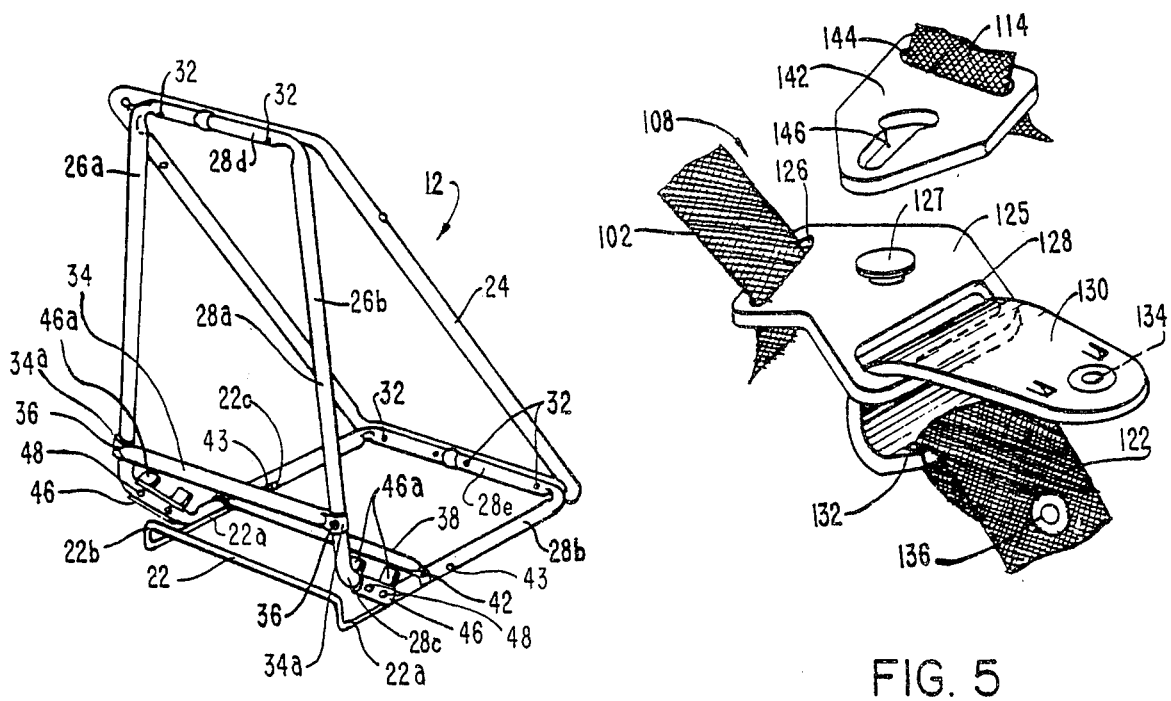
FIG. 4
FIG. 5

INFANT'S CAR SEAT

BACKGROUND OF THE INVENTION

This invention relates to an infant's car seat. It relates more particularly to a car seat which is extremely safe, yet comfortable for the child even though he or she may be required to remain in the seat for a long period of time.

Due to increased awareness by people of the various aspects of car safety, infants' car seats are being used more and more to protectively restrain infants and small children riding in automobiles. In fact, recently the U.S. government has imposed specifications and safety standards on seats of this type. Not only must the seats satisfy various static tests, they must also pass specific dynamic tests that measure the ability of the seat to protect various parts of the child's body when the automobile in which he is riding is struck from various angles.

Several car seat designs have been proposed and some have been implemented which are intended to protectively enclose the child. Generally these prior case seats are anchored to the automobile seats by the passenger lap belts that are standard equipment in all present day automobiles. Some car seats are designed to face forwardly, while others are arranged to face towards the rear of the car. Generally the prior seats include some form of relatively rigid shell in which the child sits or reclines. The automobile lap belt attaches to the shell directly or by way of frame elements to which the shell is secured.

In many cases, however, the automobiles lap belt actually engages around the child sitting in the car seat. Consequently in the event of an impact tending to throw the car seat forward, a reaction force is applied to the waist area and/or upper torso of the infant that may cause injury to the child.

In other conventional car seats utilizing a shell and frame construction, a belt and/or shoulder harness is used to hold the baby in the car seat. In many cases, however, the harness is anchored to the shell. Accordingly, upon impact, the forward momentum of the baby exerts sufficient force on the harness to cause the shell to separate from the frame, resulting in injury to the child. In still other seats of this type, the harness which restrains the child tends to exert excessive localized force on the child's body when the child is propelled forward during a rear-end collision, thereby causing internal injuries. Still other seats of this type do not provide enough protection for the baby's head particularly upon the occurrence of side impacts.

SUMMARY OF THE INVENTION

Accordingly, it is an object of the present invention to provide an infant's car seat which surely protects a child reposed therein from injury upon the occurrence of impacts from any angle.

Another object of the invention is to provide an infant's car seat which is relatively comfortable for the child to occupy even for a prolonged period of time.

Yet another object of the invention is to provide an infant's car seat which can be installed in most present day automobiles.

A further object of the invention is to provide an infant's car seat which gives a high degree of protection to the child's head upon the occurrence of side impacts.

Still another object of the invention is to provide a car seat whose restraining harness distributes forces over relatively broad areas of the child's body thereby minimizing the chances of localized internal injury to the child.

Yet another object of the invention is to provide a car seat whose forward momentum during a rear-end collision is not reflected in increased tension in the harness encircling the child resposed in the seat.

Another object is to provide a car seat which satisfies all current U.S. government static and dynamic test requirements.

Another object of the invention is to provide an infant's car seat which facilitates insertion and removal of the child.

Still another object of the invention is to provide an infant's car seat which can accommodate a child comfortably in a sitting or reclining position.

Other objects will, in part, be obvious and will, in part, appear hereinafter.

The invention accordingly comprises the features of construction, combination of elements and arrangement of parts which will be exemplified in the folding detailed description, and the scope of the invention will be indicated in the claims.

Briefly, the present car seat has a steel truss to which is attached a rigid molded plastic shaped to support a small child in a generally sitting position. The shell includes a generally horizontal seat platform, and a generally vertical backrest. The shell also has double-walled sides which project up and outward from the seat and backrest including a pair of prominent spaced-apart wings which extend out substantially in front of the head of a child sitting in the seat. The leading edges of these wings consist of flexible, resilient foam shapes which cushion the child's head especially during side impacts.

The car seat is secured to the automobile seat by the lap belt customarily found on present day cars. However instead of extending around the shell, the lap belt is passed through and engages around the truss. Guides are provided on the truss to hold the lap belt in the position which most effectively restrains the car seat and prevents it from tilting forward or cocking upon impact.

The truss includes a recliner bar hinged to the rear of the truss which can be swung forward to effectively tilt the seat rearwardly about its lap belt connection so that a child therein is supported more or less in a reclining position.

The car seat also includes a special adjustable safety harness which is anchored at five points to the truss and which is arranged to distribute impact forces over a broad area of the child's body up on the occurrence of front or side impacts. This harness is readily releasable so that a child can be placed in the seat or removed from the seat with a minimum amount of time and effort.

Thus the present car seat provides superior comfort and safety under both static and dynamic conditions, yet its cost is not excessive. Furthermore it is strong and rugged and should have a very long, useful life.

BRIEF DESCRIPTION OF THE DRAWINGS

For a fuller understanding of the nature and objects of the invention, reference should be had to the following detailed description taken in connection with the accompanying drawing in which:

FIG. 3 is a rear view of the car seat,

FIG. 4 is a perspective view of the truss incorporated into the FIG. 1 seat, and FIG. 5 is an exploded perspective view showing parts of the car seat harness in greater detail.

DESCRIPTION OF THE PREFERRED EMBODIMENT

Figure 1:
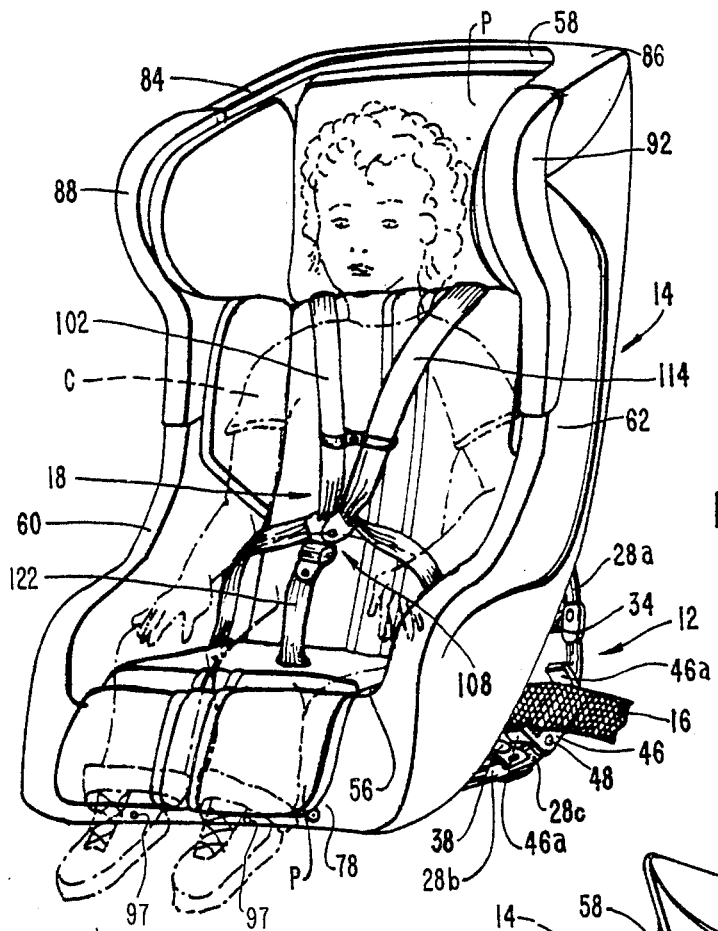
FIG. 1 is a perspective view of an infant's car seat made in accordance with this invention.

Turning now to FIG. 1 in the drawings, the present car seat includes a steel truss shown generally at 12. To the truss is attached a contoured plastic shell shown generally at 14. The truss 12 is securely anchored to the automobile seat (not shown) by a standard lap belt 16 which itself is anchored in the usual way to the floor of the automobile behind the seat.

The shell 14 is shaped to comfortably accommodate a child C as shown in dotted lines in FIG. 1. A special harness indicated generally at 18, anchored to frame 12 as will be described later engages over the hips and shoulders of the child to prevent the child from being thrown out of the car seat. Yet the harness distributes the forces over broad areas of the child's body in the event of impacts upon the automobile containing the car seat. While the harness 18 protectively restrains the child, it normally fits relatively loosely around the child and therefore does not cause undo discomfort. Furthermore, the harness 18 is designed so that when the child is placed in the car seat, the harness can be arranged properly around the child in a minimum amount of time and with minimum effort. Likewise, when it is time to remove the child from the car seat, the harness can be released with equal facility.

Figure 2:
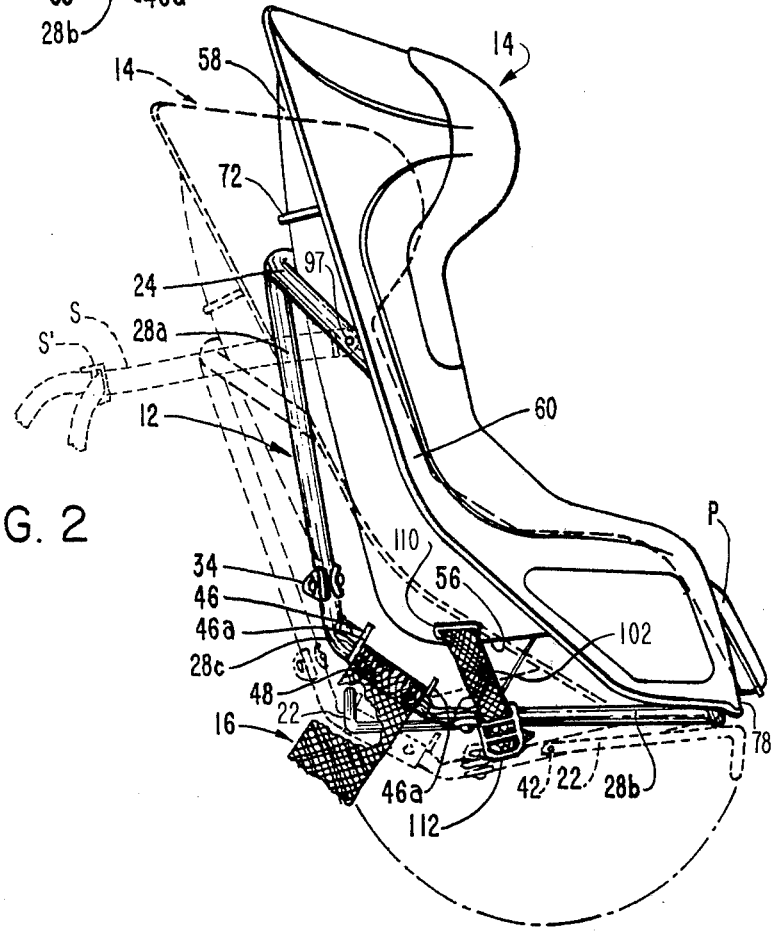
FIG. 2 is a side elevational view showing the car seat in its two operative positions.

Referring now to FIG. 2 of the drawing, the car seat can be adjusted from an upright position indicated in solid lines in FIG. 2 to a reclining position shown in dotted lines in that figure. The seat is adjusted between these two positions by manipulating a recliner bar 22 hinged to truss 12.

Referring now to particularly FIG. 4, the steel truss 12, as viewed from the side has the general shape of a right triangle and when viewed from the front, the truss is generally rectangular in shape. Truss 12 includes a generally rectangular tubular frame member 24 which forms the hypotenuse of the triangle. On the other hand, the legs of the triangle comprise mirror image frame sections 26a and 26b. Since frame sections 26a and 26b are more or less identical, we will only describe section 26b in detail.

That section includes a generally vertical leg portion 28a and a generally horizontal leg portion 28b. The two leg portions are connected together by means of a short leg segment 28c which extends at an oblique angle relative to the two leg portions. The upper end 28d of leg portion 28a is bent laterally at right angles, as is the lower end 28e of leg portion of 28b. The two leg ends 28d and 28e are flattened and curved to conform to the curvature of the tubular frame member 24. The frame section 26a has similar legs and ends. The two frame sections are positioned at opposite sides of frame member 24 and their ends 28d and 28e are secured to the upper and lower stretches of frame member 24 by rivets 32 as best seen in FIG. 4.

The truss 12 is further braced by means of a horizontal tubular frame member 34 stretching between sections 26a and 26b near the lower end of the leg portions 28a. The ends 34a of frame member 34 are flattened and curved around leg portions 28a and are secured to the leg portions by rivets 36. A similar tubular frame member 38 streches between frame sections 26a and 26b at the bottom of truss 12. Member 38 is secured to leg portions 28b by means of rivets 42. The steel truss 12, then, formed as aforesaid is extremely rigid and rugged and resistent to racking.

The recliner bar 22 is a generally C-shaped member with spaced-apart parallel legs 22a connected by a bridge portion 22b with leg segments adjacent the bridge bent at right angles relative to legs 22a as best seen in FIG. 4. The free ends of legs 22a terminate in outwardly bent portions 22c which project into openings 43 in the sides of leg portions 28b thereby hinging bar 22 to those leg portions. When the recliner bar 22 is in its rear-most position shown in solid lines in FIG. 4, the frame leg portions 28b rest on the automobile seat so that the car seat is oriented generally vertically as shown in solid lines in FIG. 2. However, when the recliner bar 22 is swung forwardly as shown in dotted lines in FIG. 2, the downwardly turned bridge portion 22b thereof engages the automobile seat. This raises up the front edge of the car seat, thereby tilting the seat about a pivot coinciding with the location of lap belt 16 on the truss so that the car seat assumes its reclining position shown in dotted lines in FIG. 2.

The lap belt 16 is held in the proper position on truss 12 by a pair of identical brackets 46 secured by rivets 48 to the leg segments 28c at the opposite sides of truss 12. Each bracket 46 has a pair of upper and lower upstanding lips 46a which maintain the lap belt centered on leg segments 28c when the belt is engaged through the truss as best seen in FIGS. 1 and 2.

Turning now to FIGS. 1 to 3, shell 14 is a one-piece molded shell made of a suitable impact-resistant rigid plastic, such as polypropylene. The shell includes a horizontal seat platform 56 and upstanding back wall 58. Connecting the seat platform and back wall are a pair of spaced-apart side walls 60 and 62 which extend from the top of the back wall to the front edge of the seat platform and which form the sides of the car seat as a whole. The side walls 60 and 62 extend up and out appreciably from the seat platform and back wall of the car seat to provide side protection for a child sitting in the seat.

As best seen in FIG. 3, each seat side wall 60, 62 is actually composed of spaced-apart inner and outer webs 64 and 66 which are formed during the molding process. As a result of this double web construction, each side wall 60 and 62 constitutes a beam extending from the top to the bottom of the car seat that prevents the shell 14 from bending or racking in the event of an impact on the automobile containing the car seat. As shown in FIG. 3, the shell 14 is further rigidified at the top by a rearwardly extending skirt 58' integral with rear wall 58 which connects to webs 66. Also additional strength is provided by short vertical ribs 68 projecting out from the rear of back wall 58 adjacent skirt 58' and by a horizontal rib 72 projecting out from the rear of wall 58 below ribs 68. Rib 72 extends all the way across shell 14 and prevents the shell from bending about a vertical axis. Additional short vertical ribs 74 superimposed on ribs 72, along with long vertical ribs 76 projecting out from the rear of wall 58, lend additional rigidity to the mid-portion of shell 14.

The seat shell 14 also includes a leg rest portion 78 extending down below the seat platform 56 between the seat side walls 60 and 62. Portion 78 provides support for the child's legs and prevents them from being bent back under the seat during collision from the rear.

As best seen in FIGS. 1 and 2, the seat side walls 60 and 62 include a pair of prominent wings 84 and 86 which project forwardly from the side walls adjacent the location of the child's head. Wings 84 and 86 also have the double web construction described above in connection with the seat side walls so that they are able to prevent the child's head from being swung appreciably to either side in the event of side impacts upon the automobile.

The front edges of wings 84 and 86 actually consist of molded shapes 88, 92 made of relatively stiff, but resilient plastic foam material. The shapes 88 and 92 are secured to the front edges of wings 84 and 86 by a suitable adhesive and/or by mechanically securing them to the wings by screws or other fasteners extending through the front edges of wings 84 and 86 and into rigid inserts molded into the plastic shapes 88 and 92. Thus, in the event the child's head is swung violently to the side, it contacts the resilient shapes 88 and 92 which thereby cushion the head against injury.

The shell 14 is positioned on truss 12 with the sides of member 24 being between webs 64 and 66 and the shell is scured to truss 12 by any convenient means such as rivets 97 extending through the side walls and the portion 78 of the shell and the truss members.

A resilient pad P is secured in shell 14 and covers those areas that could be contacted by a child sitting in the seat. Thus the pad includes a section covering the seat back wall 58, the seating platform 56 and the side walls 60 and 62 as well as the wings 88 and 92. The pad provides further protection for the child against injury due to impacts from the rear or either side.

As mentioned previously, a child sitting in the car seat is free to move to a degree, but is restrained by a harness 18 which engages over the child's shoulders and around his hips and is anchored to the frame 12 at five spaced-apart locations. Furthermore as noted previously, the harness 18 is designed to distribute forces arising upon impact over broad areas of the child's body to minimize the chances of localized internal injury.

More particularly and referring to FIGS. 1 to 3, harness 18 includes a strap 102 which upper end extends through a slot 104 (FIG. 3) in back wall 58 and is engaged around the top of frame 12 being secured thereto by buckle 106. Strap 102 passes down over the right shoulder of the child and through a releasable fixture shown generally at 108 in FIG. 1 to be described in detail later. Then the strap 102 passes around the right hip of the child and through a slot 110 in the seat side wall 60 as best seen in FIG. 2. Thence the lower end of the strap is engaged around leg 28b of frame section 26b and secured thereto by a buckle 112.

Referring particularly to FIGS. 1 and 3, the harness 18 also includes a second strap 114 whose upper end extends through a slot 116 in the seat back wall 58 and engages around the top of frame 12 being secured thereto by a buckle 118. The strap 114 passes over the child's left shoulder and extends through fixture 108 and thence around the left hip of the child. The lower end of strap 114 passes through a slot like slot 110 in the left side wall 62 of the car seat and is engaged around and secured to leg 28b of frame section 26a by means of a buckle like buckle 112. Actually the securement of the lower end of strap 114 is exactly the same as that of strap 102 shown in FIG. 2.

A third strap 122, best seen in FIGS. 1 and 3, is secured at its lower end to the bottom stretch of frame member 24 by means of a buckle 124 (FIG. 3). Strap 122 extends up through platform 56 and pad P and over the crotch of the child and its upper end is secured to fixture 108 as shown in FIG. 1.

As best seen in FIG. 1, the straps 102 and 114 are free to slide relative to fixture 108. Therefore any force exerted at any point along the lengths of those straps is distributed along the entire lengths of the straps. Therefore no one portion of the child's body is subjected to undue localized stress. In other words, if the torso of the child is thrust forward, say, from left to right, the upper portion of strap 114 restrains the child's left shoulder while giving somewhat, with the result that the strap 114 slides through fixture 108 causing the lower end of strap 114 which extends around the child's left hip to become taut which, in turn, tensions strap 102 via fixture 108. Thus the force is distributed over the entire harness.

The same situation prevails with strap 102 in the event the child's torso is thrust forward from right to left. Similarly, if a particular impact tends to propel the child from seat platform 56, the force on the portions of the straps engaging around his hips is transmitted to the upper portions of straps 102 and 104. Again, then, the forces are distributed over the entire lengths of the straps and thus over a broad area of this child's body. This arrangement helps to assure that despite violent impacts from any direction, no excessive amount of force will be applied to any particular part of the child's body. At the same time, the child is able to ride for a long period of time in the car seat because the harness 18 does not normally tightly grip the child, but actually allows a certain degree of movement in the car seat.

To relieve or tighten the lap belt and shoulder belt portions of harness 18 only a single adjustment at each side of the car seat is required. The lower ends of the straps 102 and 114 at the sides of the car seat are tightened or loosened by means of buckles 112 as needed to properly tension the straps.

Referring now to FIG. 5, the fixture 108 comprises three main parts. A flat bracket 125 contains a slot 126 through which the strap 102 passes and a stud 127 projects up from the top of the bracket. Bracket 125 also contains a second slot 128 opposite slot 126 which is shaped to receive the second part of fixture 108, namely, a crotch strap buckle 130. Buckle 130 is simply a curved stamping having a slot 132 to which is connected the upper end of crotch strap 122.

The buckle 130 is arranged to be inserted through slot 128 in bracket 125 and more or less turned down on itself. A male snap fastener element 134 affixed to the upper end of buckle 130 at the underside thereof is arranged to connect to a corresponding female snap fastener element 136 secured to the upper surface of strap 122. When the two elements are connected together, the buckle 130 is firmly secured to bracket 125 as shown in FIG. 1.

The third component of fixture 108 is a bracket 142 having a slot 144 through which passes the strap 114. A keyhole 146 is formed in bracket 142 opposite slot 144 which is arranged to receive the stud 127 on bracket 125 to connect the strap 114 to the straps 102 and 122, as shown in FIG. 1.

When a child is placed in the car seat with the harness straps draped over him, the stud 127 is placed in the keyhole 146 to join the strap segments forming the shoulder harness to the strap segments forming the lap belt. Next the crotch strap buckle 130 is inserted through slot 128 and the snap fastener element 134 is secured to element 136.

Preferably the car seat is placed only on a forwardly facing vehicle seat in the rear or front seat center position in the automobile for maximum safety. The automobile lap belt must be pulled tightly through truss 12 to limit forward and lateral excursion in the case of a serious accident.

If desired, greater impact protection may be afforded by a lateral tie-down strap S shown in dotted lines in FIG. 2 extending between a stud on the inboard side of frame member 24, say, at 97 and auto lap anchor slot or sewn belt loop (not shown). The tie-down strap S is preferably adjustable in length by means of a slide adjuster S' so that the appropriate tension can be maintained in that strap. Thus if the automobile in which the car seat is located is struck from the side, there will be little tendency for the car seat to be displaced laterally relative to the automobile seat on which it rests.

The car seat described herein has undergone substantial static and dynamic testing which shows that it can meet the most rigid U.S. government specified tests for infant's car seats. This rugged construction enables it to protect the child even under very forceful impacts from almost any direction on the automobile in which seat is installed.

It will thus be seen that the objects of set forth above among those made apparent from the preceding description are efficiently attained, and since certain changes may be made in the above construction without departing from the scope of the invention, it is intended that all matter contained in the above description or shown in the accompanying drawing be interpreted as illustrative and not in a limiting sense. It is also to be understood that the following claims are intended to cover all of the generic and specific features of the invention herein described.

I claim:

1. An infant's car seat comprising
   A. a truss formed of frame members, said truss having a generally triangular shape in side elevation, and a generally rectangular shape in rear elevation, said truss comprising
      1. a generally rectangular frame member,
      2. a first frame section having first and second portions formed at right angles to one another, said frame section having third and fourth portions integral with the free ends of the first and second portions, said third and fourth portions being oriented at right angles to the first and second portions,
      3. means for connecting the third and fourth portions of the first frame section to the upper and lower edges of the frame member at one side thereof,
      4. a second frame section, said second frame section being a mirror image of the first frame section, and
      5. means for securing the third and fourth portions of the second frame section to the upper and lower edges of the frame member at the opposite side thereof from the first frame section,
   B. a rigid, molded plastic shell interfitting with the hypotenuse of said truss, said shell including a seating platform adjacent the base leg of said truss, a back wall adjacent the rear leg of said truss and spaced apart side walls projecting upwardly from the side edges of the seating platform and back wall, each said side wall being composed of spaced-apart webs which form a rigid beam extending from the top of the shell to the bottom thereof, the spaces between each set of said webs being adapted to receive the members forming the hypotenuse of said truss, and
   C. means for securing the shell to members of the truss.

2. The car seat defined in claim 1
   A. wherein each side wall includes a prominent wing portion projecting well forwardly at the top portion of the shell to provide protection at each side of the head of a child sitting in the car seat and,
   B. further including a resilient shape secured to the leading edge of each of said wing.

3. The car seat defined in claim 1 and further including
   A. a flexible pad positioned in said shell and covering the seating platform and the back and side walls, and
   B. means for removably securing the pad to the shell.

4. The car seat defined in claim 1 and further including a flexible belt extending through the truss, the opposite ends of said belt being anchored at points behind said truss.

5. The car seat defined in claim 1 and further including a harness for retaining a child in the car seat, said harness including
   A. a first strap,
   B. means for anchoring one end of the first strap to a point of the truss behind the upper left-hand portion of the back wall,
   C. means for securing the other end of the first strap to a point on the truss below the left rear corner of the seating platform,
   D. a second strap,
   E. means for securing one end of the second strap to a point on the truss behind the upper right-hand portion of the back wall,
   F. means for securing the opposite end of the second strap to a point on the truss below the right rear corner of the seating platform,
   F. a first fixture slidably connected to the first strap,
   H. a second fixture slidably connected to the second strap,
   I. means for removably connecting the first fixture to the second fixture, and
   J. means for removably anchoring the first and second fixtures to a point on the truss below the front edge of the seating platform.

6. The car seat defined in claim 5 wherein the anchoring means comprise
   A. a third strap,
   B. means for anchoring one end of the third strap to a point on the truss below the front edge of the seating platform, and
   C. a third fixture connected to the opposite end of the third strap, said third fixture being arranged to removably connect to one of the first and second fixtures.

7. The car seat defined in claim 1 and further including
   A. a second frame member, oriented parallel to the upper and lower edges of the first frame member, B. means for securing the opposite ends of the second frame member to the first portions of the first and second frame sections, C. a third frame member oriented parallel to the upper and lower edges of the first frame member, and D. means for securing the opposite ends of the third frame member to the second portions of the first and second frame sections.

8. An infant's car seat as defined in claim 1 and further including means for adjustably supporting the car seat in a generally upright position and in a generally reclining position, said supporting means including a raised member swingably mounted on the base leg of the truss and movable between a forward position wherein the base leg of the truss is supported on the raised member and a rearward position wherein the raised member is located out of the way behind the truss.

* * * * *

UNITED STATES PATENT AND TRADEMARK OFFICE
CERTIFICATE OF CORRECTION

PATENT NO. : 4,033,622
DATED : July 5, 1977
INVENTOR(S) : Robert J. Boudreau

It is certified that error appears in the above-identified patent and that said Letters Patent are hereby corrected as shown below:

In the specification:

Col. 2, line 9, "resposed" should be --reposed--.
" 2, " 23, "folding" should be --following--.
" 2 " 27, after "plastic" insert --shell--.
" 2, " 67, "drawing" should be --drawings--.
" 4, " 5, "streches" should be --stretches--.
" 4, " 39, after "and" insert --an--.
" 5, " 28, "scured" should be --secured--.
" 7, " 17, after "lap" insert --belt--.
" 7, " 28, "infant's" should be --infants'--.
" 7, " 32, omit --of--.
" 7, " 38, "drawing" should be --drawings--.
" 7, " 46, after "elevation" remove comma (,).

In the claims:

Col. 8, line 2, "spaced apart" should be --spaced-apart--.

Signed and Sealed this

Eighth Day of November 1977

[SEAL]

Attest:

RUTH C. MASON
*Attesting Officer*

LUTRELLE F. PARKER
*Acting Commissioner of Patents and Trademarks*